April 8, 1969 S. T. DEAKIN 3,437,794

SENSING DEVICES

Filed Dec. 15, 1964 Sheet 1 of 5

STANLEY THOMAS DEAKIN
Inventor

By John P. Chandler
Attorney for Applicant

Inventor
STANLEY THOMAS DEAKIN

By JOHN P. CHANDLER
His Attorney

Inventor
STANLEY THOMAS DEAKIN
By JOHN P. CHANDLER
His Attorney

Inventor
STANLEY THOMAS DEAKIN
by
JOHN P. CHANDLER
His Attorney

Inventor
STANLEY THOMAS DEAKIN
By
JOHN P. CHANDLER
His Attorney

United States Patent Office 3,437,794

Patented Apr. 8, 1969

3,437,794

SENSING DEVICES

Stanley Thomas Deakin, Walton-on-Thames, England, assignor to Sealectro Corporation, Mamaroneck, N.Y., a corporation of New York Filed Dec. 15, 1964, Ser. No. 418,479
Claims priority, application Great Britain, Dec. 17, 1963, 49,792/63
Int. Cl. G06k 7/04
U.S. Cl. 235—61.11 15 Claims

ABSTRACT OF THE DISCLOSURE

A card reader for sensing the data holes in a punched data card. A plurality of pins, one for each hole space, are arranged for resilient application to the card. The pins sense a hole, pass through the card and cause an electrical contact to be made between the sensing pin and the turned-over end of a fixed conductive pin. The pins which do not sense a hole, limit against the surface of the card, compressing an operating spring, and no contact is made. The sensing pins are returned to normal by a series of bails.

Figures 1, 15, 16:
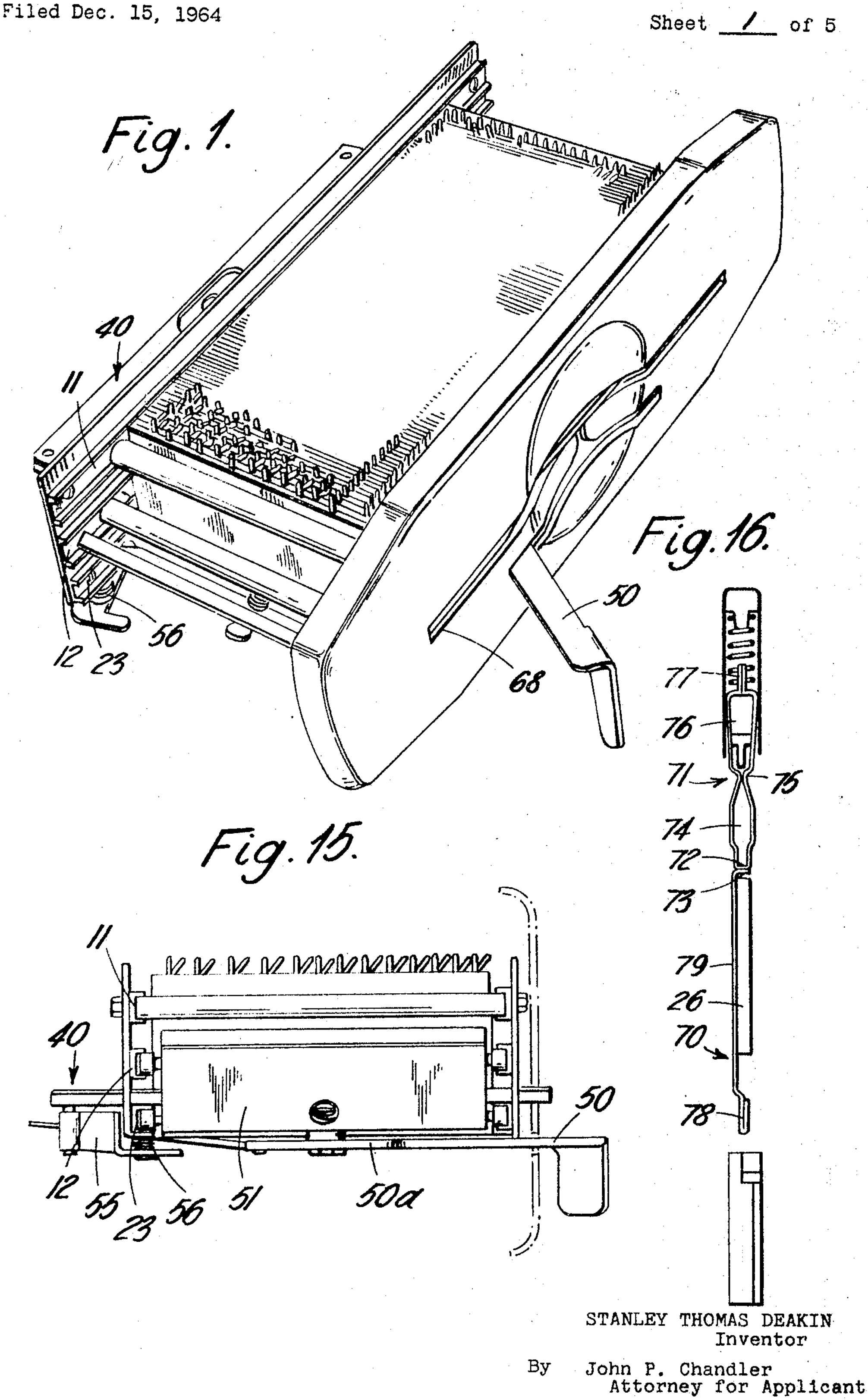

This invention relates to devices for sensing the holes in punched cards or webs (herein called cards), and in particular to such devices which sense the holes by means of one or more sensing pins. Such devices will hereinafter be termed as being "of the kind described." The number of sensing pins provided usually depends on the number of possible places in which the card may be punched, i.e. one pin is provided for each possible hole in the card or at least a portion of it.

The invention provides a sensing device of the kind described which comprises a support for a card to be sensed, a multiplicity of electrically conductive sensing pins arranged in parallel side-by-side relation and guided for movement in the lengthwise direction thereof towards and away from the support, means for moving the pins towards the support, which means permit the movement of pins which engage a card on the support to be arrested by the card while the movement of pins which sense holes in the card is continued, means for making electrical connections to the pins and, for each pin, an electrical contact on the side of the card remote from the support which contact is engaged by the pin only if the movement of the pin is continued as aforesaid, whereby in the case of a pin which senses a hole the contact is brought into electrical connection with the said connection making means for that pin and an external circuit may be completed, and means for effecting return movement of the pin away from the support.

In use the pins will normally be arranged for up and down movement towards and away from the support and for simplicity of description, this will be assumed to be the case in what follows both in the specification and the claims but it is to be understood that the pins may move in other directions, e.g. horizontally.

The pins are preferably arranged in parallel rows each row of pins may be guided for said movement towards and away from the support by a moulding the mouldings being held and located by two spacers each of which comprise a metal channel member which is provided with square teeth, each alternate tooth being bent inwardly, and which houses portions of the mouldings therein.

Preferably each pin is moved in the downward direction (i.e. towards the support) by a spring or by a solenoid-operated means located above the pin.

Each pin is preferably moved in an upward direction (i.e. away from the support) by a mechanically operated bar or bars acting on a projection provided on the pin. It is preferred that with this arrangement the same bar or bars operates all the pins in one row, and it is further preferred that all the bars are inter-connected at their ends (i.e. by spacers described above) so that the bars may all be operated together. The bar or bars or each bar may suitably be operated by a cam or by a lever system which provides a toggle action to provide upward lift to each bar and hence to each pin.

In the case where each pin is moved in a downward direction by a solenoid-operated means, the pin may be moved in an upward direction by a spring.

If desired one or more of the contacts may be interlinked with one or more of the other contacts. In this way it is possible to use the device as a patchboard of which the selected circuits will depend on the holes in the card.

The support for the card preferably has holes or slots for reception of the pins passing through the holes in the card. One form of support may comprise a number of adjacent transverse cross-bars inter-connected at the edges (e.g. by spacers as described above), each cross-bar being provided with the required number of holes or slots for one row of pins. Alternatively the support may comprise a sheet of material (e.g. anodised aluminium) having transverse slots or ribs pressed out of the sheet to provide holes or slots for reception of one or more of the pins.

A further construction may comprise a support plate having parallel slots cut in it to form narrow bars and the bars being twisted to lie perpendicular to the plane of the plate to provide supports for the card and slots between the bars for the pins.

It is further preferred to provide a stop for each pin passing through the card to limit its downward travel. This stop may be provided below the top surface of the support plate or by a stop on the pin engaging an abutment on a part of the device above the support.

In one form of the invention some or all of the pins are each constructed of strip metal which may be gold-plated, bent on itself to provide two parallel legs. The legs lie close to one another for part of the length of the pin at the folded or bent end, this being the end employed to contact the card. The legs are then separated to embrace between them but in spaced apart relation the contact for that pin and are then brought together again, the arrangement being that on lengthwise movement, as aforesaid, the separated legs move relative to the contact and if the pins sense a hole the movement continues until the legs where they are brought together engage the contact. Alternatively the pins may be constructed from two lengths of strip metal one part comprising the two parallel legs employed to contact the card and the other part, which may be gold-plated, comprising the separated part which contains the section of the pin which is engaged by the contact when a hole is sensed. In either case the legs may separate again beyond the place where they are brought together and embrace the guide member. The means for making electrical connection to the pins may comprise metallic guides or busbars which rub against the legs at a position where they are separated and a single guide or busbar may be provided for each row of pins.

The device preferably includes a card tray for inserting a card into the device such that it lies over the support plate, the movement of the tray being effected in conjunction with the means for moving the pins towards and away from the support in such a manner that the card lies over the support plate before the pins move towards the support.

The device also preferably includes means for detecting whether a card is correctly located on the support or, if a tray is provided, correctly located in the card tray. The detecting means may, for example, operate to detect that a particular part of the card (e.g. one corner) is absent. Means may also be provided in the case of a tray being provided whereby the device is inoperative unless the card is correctly located in the card tray.

More specifically the invention provides a sensing device of the kind described comprising a support plate for a card to be sensed, the plate having, in respect of each pin, an aperture for reception of the pin and a stop to limit the travel of the pin, a plurality of rows of electrically conductive sensing pins arranged for movement in the lengthwise direction thereof towards and away from the support, the pins of each row being arranged within an insulating moulding, being spring urged towards the support plate, which springs permit the movement of the pins which engage a card on the support plate to be arrested by the card while the movement of the pins which sense holes in the card is continued and being separated from each adjacent row by a sheet of insulating material, a plurality of busbars for making electrical connection with the pins, each busbar making electrical connection with one row of pins, an electrical contact, for each pin, attached to the said mouldings in which the row of pins are arranged for movement towards the support plate, which contact is engaged by the pin only if the movement of the pin is contained as aforesaid, whereby in the case of a pin which senses a hole the contact is brought into electrical connection with the busbar with which the pin is in electrical contact and an external circuit may be completed, means for effecting the return movement of each row of pins away from the support which means comprises, in respect of each row, a mechanically operated bar or bars acting on projection provided on the pins and also means for operating all the bars simultaneously, which means also holds the pins away from the support plate and when moved towards the support plate allows the springs to effect movement of the pins towards the support plate, a card tray for inserting a card into the device such that it lies over the support plate, the movement of the tray being effected in conjunction with the said mechanically operated bars in such a manner that the card lies over the support plate before the pins are moved towards the support plate and means for detecting whether a card is correctly located in the card tray, which means operate to detect that one corner of the card is absent.

Figures 2, 3, 4, 5:
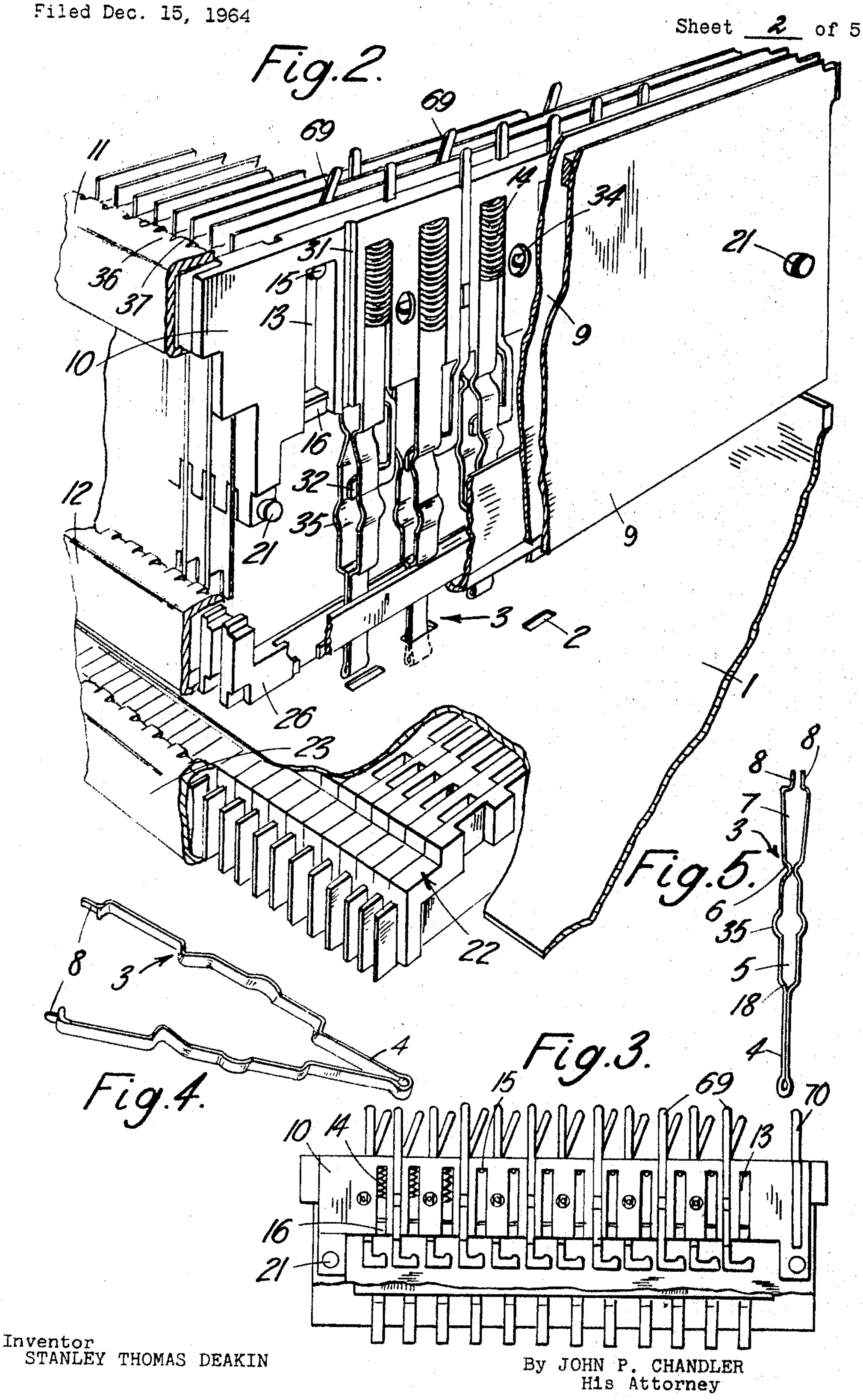
Figures 6, 7, 8, 9, 10, 11:
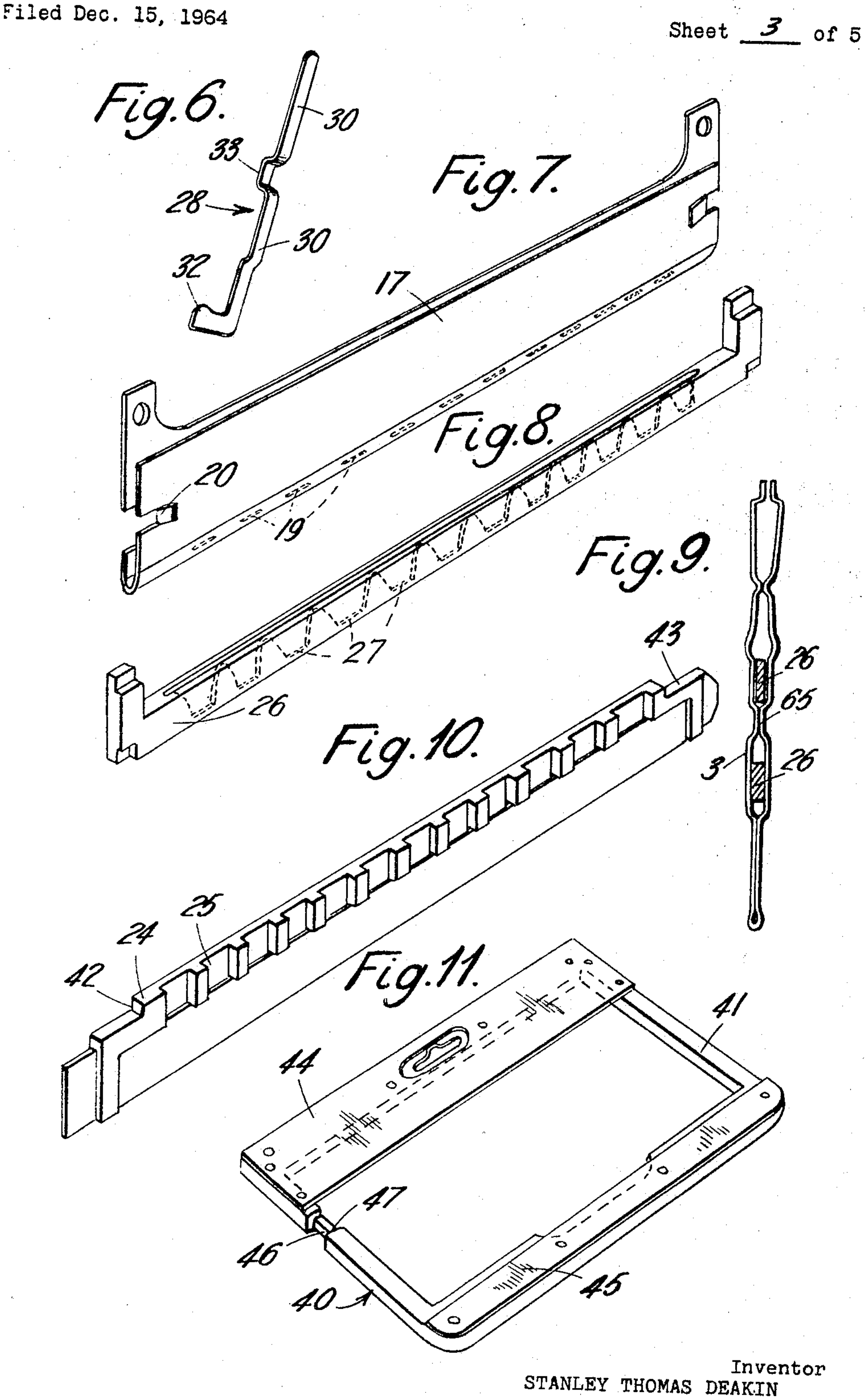
Figure 12:
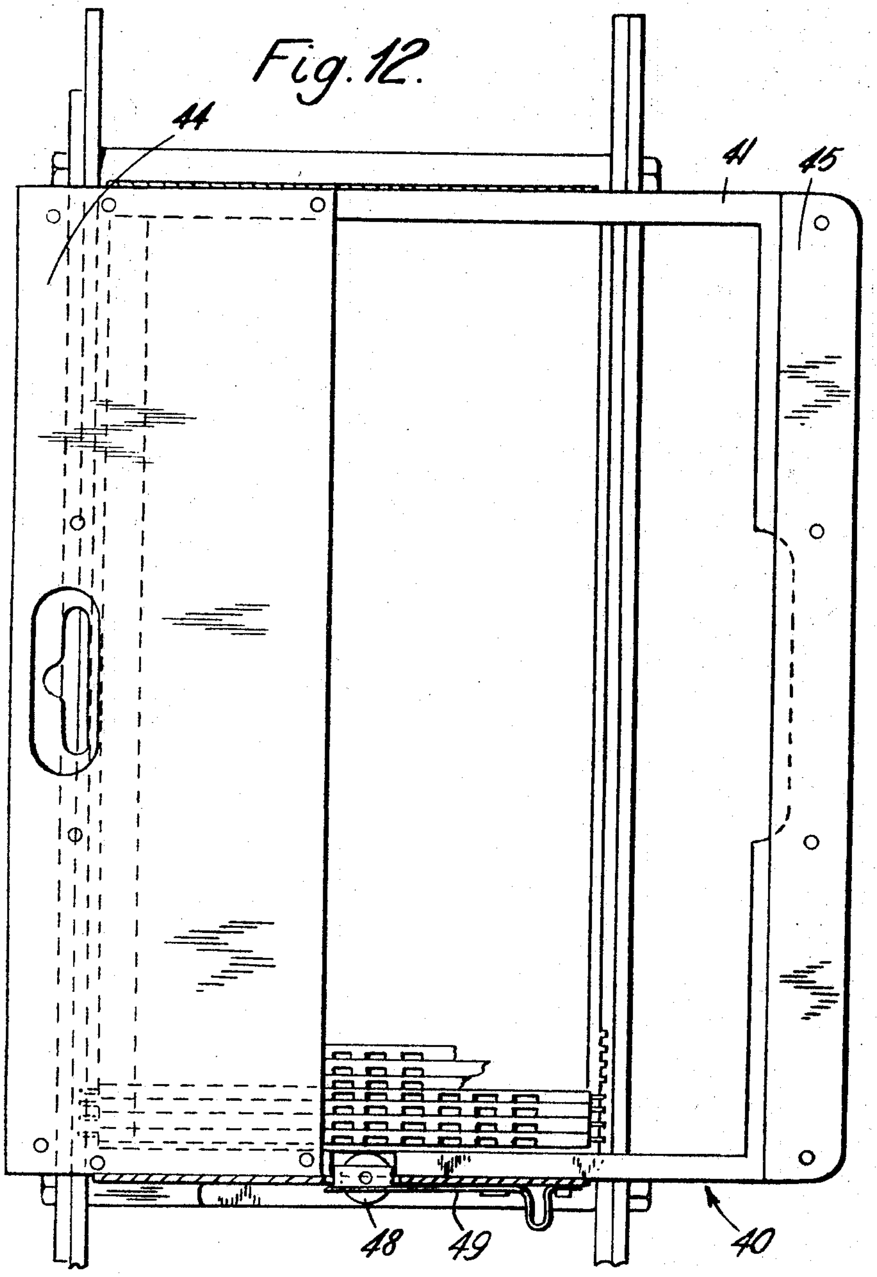
Figures 13, 14:
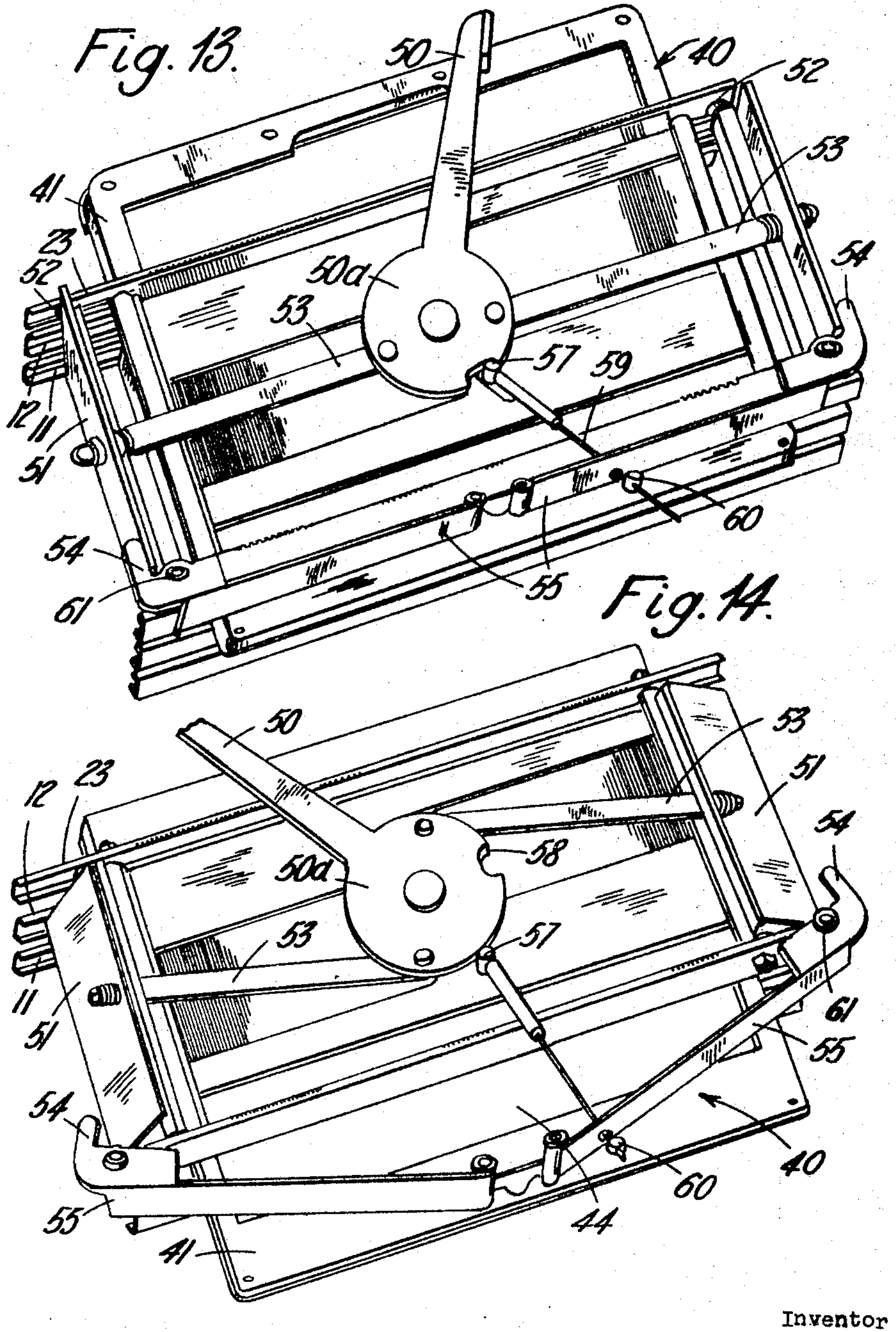

By way of example, a sensing device constructed in accordance with the invention will now be described with reference to the accompanying drawings, in which:

FIGURE 1 is a perspective view of the sensing device,

FIGURE 2 is a perspective view of the sensing device shown without the card tray and its associated means for operating the tray and the sensing pins and shown in part cut-away form to show more clearly some of the different parts of the device, FIGURE 3 shows a transverse cross-section of the device which is partly cut-away to show some features of one row of sensing pins and other features of the adjacent row of sensing pins, FIGURE 4 shows in detail one of the sensing pins shown in FIGURES 2 and 3, in the free state, FIGURE 5 shows the sensing pin shown in FIGURE 4 in its closed-up form, FIGURE 6 shows the individual contact engageable by each sensing pin, FIGURE 7 shows the busbar provided for each row of pins, FIGURE 8 shows the bar for raising and lowering each row of pins, FIGURE 9 shows an alternative form of bar to that shown in FIGURE 8, the bar being shown in section and in combination with one of the sensing pins, which pin is also of different construction and which pin is shown in its raised position, FIGURE 10 shows one of the eighty members forming the card support plate, FIGURE 11 is a plan view of the card tray, FIGURE 12 is a plan view of the card tray and of the card feeling means in their assembled position with the card tray in its outermost position, i.e. before a card has been inserted therein, FIGURE 13 is an under plan of the card tray and the means for operating the tray and the sensing pins, the tray being shown in its said outermost position and the operating means being shown in the position in which the sensing pins are in their raised position, FIGURE 14 is an under plan of the card tray and the means for operating the tray and the sensing pins, the tray being shown in its innermost position, i.e. in which a card inserted therein lies wholly over the support plate therefor, and the operating means being shown in the position in which the sensing pins are in their lowered position, FIGURE 15 is an end view of the device as shown in FIGURE 1, and FIGURE 16 shows a modified form of sensing pin.

With reference to the drawings, the sensing device shown is applicable for sensing any permutation of holes on a punched card 1 (see FIGURE 2), the card being of a particular size and each of the punched holes 2 being of rectangular shape and being punched in one of a number of predetermined places on the card. In this example, the card has eighty rows of such places symmetrically located across the width of the card, each row containing twelve places.

The sensing device is thus provided with eighty rows of sensing pins 3, each row containing twelve pins and the whole being constructed as a unit. Each sensing pin is made from gold-plated sheet metal (see FIGURES 4 and 5) pre-pressed to the desired form and then doubled over so that each pin, when doubled over, comprises two parallel legs. These legs lie close together for the part 4 of the length of the pin, the part 4 being the folded end of the pin, this being the end employed to contact the card. The legs then separate to form an open section 5, the junction of the open section 5 and the part 4 forming a step 18, the function of which is fully described below. The other end of this open section 5 is tapered to a point 6, the legs then opening out again to form a second open section 7 and finally the legs lie close to one another in the form of two tags 8.

Each row of sensing pins 3 is separated from its adjacent row or rows by a Bakelite (registered trademark) sheet 9 and each pin is separated from its adjacent pin or pins in the same row by the wall of an insulating plastics moulding 10 (see FIGURES 2 and 3). Each sheet 9 and each moulding 10 extends the whole length of the row of pins, the sheet 9 and the mouldings 10 being symmetrically held and located by two spacers 11, each of which comprises a metal channel member which is provided with square teeth 36 and 37, the teeth 36 being bent inwardly into the spaces between the sheets 9 and which houses portions of the sheets and of the mouldings therein. This method of aligning the sheets 9 and the mouldings 10 is more accurate than is obtainable by orthodox methods of moulding since the sheets and mouldings are individually held by means of the teeth 36 and 37 formed in the channel members 11 thereby accurately locking the sheets and mouldings thereto.

Each moulding 10 is provided with twelve slots 13, each slot housing the top end of one of the pins 3 also a spring 14. Each spring is held within its slot 13 in a state of compression so that it will tend to force the top end of its pin 3 downwardly out of the slot. The spring is maintained in its correct position within the slot by fitting its lower end over the tags 8 of the pin, thus also retaining the pin in its closed up form as shown in FIGURE 5, and its upper end over a stud 15 provided in the upper end of the slot 13. Though the spring tends to force the top end of the pin out of the slot, the top end of the pin and the spring are held wtihin the slot by the presence of the portion 16 of the moulding 10. This portion 16 is of thinner cross-section than the remainder of the moulding 10 so that it may lie within the open portion 7 of the pin and form a guide therefor, the portion 7 of the pin being assembled around the portion 16 of the moulding 10 before the spring 14 is fitted over the tags 8.

A metal trough or busbar 17 (see FIGURE 7) is provided for making electrical contact with the pins of each row of pins, one trough 17 being provided for each row of pins of the device and the electrical contact being made by locating the trough such that the inside wall thereof lies in rubbing contact with the legs of the pins at an expanded part 35 of the open section 5 of the pins. Electrical contact is made with each trough 17 by means of contacts 70 (see FIGURE 3).

The base of each trough has twelve slots 19, each slot providing a passageway or guide for the end portion 4 of one of the pins during its up and down movement. Each trough 17 is attached to its adjacent sheet 9 by tabs 20, the assembly of the sheets 9, the mouldings 10 and the troughs 17 being connected by moulded pegs 21 each of which is part of a moulding 10 that passes consecutively through one of the walls of the adjacent trough 17, through the adjacent sheet 9, through one of the walls of the next trough 17 and into a socket in the next moulding 10. These pegs may also be supplemented by, e.g., bolts (not shown), which extend lengthwise through the device.

Underneath the troughs 17 and below the pins 3 is a multielement support plate 22. This plate is such that it supports a punched card 1 placed thereon and also allows passage of all of the pins to pass through the card, if the card is so punched, and through the plate.

The plate 22 (see FIGURE 2) comprises eighty transverse Bakelite bars 24 held in place by channel members 23 which are identical to the channel members 11 above described. Each bar 24 (see FIGURE 10) is formed with twelve rectangular grooves 25, the bars being assembled in the channel members 23 so that they lie adjacent one another as shown and so that the grooves 25 allow the pins to pass therethrough.

Alternatively the plate may comprise an anodised aluminium channel member (not shown) in which the holes for the pins are provided for by pressing out transverse parts to form continuous transverse slots.

Referring back to the movement of the pins, the upward movement of the pins (i.e. away from the support) is effected by transverse bars 26 (see FIGURES 2 and 8) held in place at either end by a channel member 12, each bar being made of insulating material and being threaded along the respective trough 17 at such a height that the top surface of the bar rests underneath the steps 18 provided by each pin 3. Each bar is provided in its base with twelve holes 27 through which the pins may pass. Thus if the bars 26, together with the channel members 12, are raised, the pins will be raised thereby, upward movement of the pins in turn compressing the springs 14 within the recesses 13. If the bars 26 are then lowered the pins will also move in a downward direction under the action of the compressed springs 14, the downward movement of some of the pins being halted by the card, i.e. where the card is not punched, and the movement of the remainder of the pins being halted by the portions 16 of the mouldings 10, these pins having already sensed or passed through a punched hole 2 in the card 1, and passed into one of the slots 25 in the support plate 22. The operating means for raising and lowering of the bars 26 is fully described below.

In order that those holes in the card which are sensed by the pins are recorded, a fixed contact 28 (see FIGURES 2 and 6) is provided for each pin, the contact being located such that the pin and the contact will complete an electrical circuit through the trough 17, pins 3 and contact 28 on passage of the pin through the card.

Each contact 28 comprises a length of L-shaped metal strip, the lower portion of the strip, being cranked so that the parts 30 of the contact may fit within a slot 31 provided in the moulding 10 and the part 32 of the contact may be located within the open section 5 of the sensing pin 3 such that the part 32 will make contact with the pin at the point 6 on sufficient downward movement of the pin, i.e. only when the pin has sensed a hole 2. The contact is fixed in position within the slot 31 by means of a double-cranked portion 33 of contact passing into a through hole 34 provided in the base of the slot 31. The hole is countersunk from the outer side of the moulding to provide a space in which part of the portion 33 of the contact may be misformed in a manner such that the contact is firmly held within the slot 31. The upper parts 69 of each contact 28 provides means whereby an electrical connection may be made therewith. As may be seen from FIGURES 2 and 3 the upper parts 69 of each alternate row of contacts 28 are inclined to provide sufficient space for the electrical connections to be made therewith.

With reference to FIGURES 11 to 15, a card tray 41 and operating means associated therewith is provided for inserting the card 1 through the slot 68 (see FIGURE 1) into the device such that it lies over the support plate 22 and for raising and lowering the bars 26 and hence the sensing pins 3. The construction of the card tray and the said operating means will now be described. The card tray 40 comprises a metal frame 41 guided by the framework of the device to move from its outermost position, as shown in FIGURES 12 and 13 to its innermost position as shown in FIGURE 14. In the former position a card 1 may be inserted into or removed from the tray 40 and in the latter position the card 1 lies over the support plate 22. The location of the tray is such that the top surface of the frame 41 is level with the top surface of the support plate. The two extreme positions of the tray are governed by the frame engaging steps 42, 43 (see FIGURE 10) provided by the individual members of the support plate and the card is retained on the side frame members of the tray by two Bakelite sheets 44, 45 attached to the top surface of the said frame of the tray.

As clearly shown in FIGURE 11, one side member of the frame 41 of the tray has a portion 46 of smaller cross-section, which portion is provided for engagement with card feeling means which is such that the tray may be moved from its outermost position to its innermost position only after the feeling means has been removed from the recess 47 provided by the said smaller portion 46 and that the feeling means may be moved as aforesaid only by a certain portion of the card, i.e. a nicked corner of the card. This means ensures that unless the card is inserted into the tray correctly the device is inoperative. The feeling means comprises a roller 48 (see FIGURE 12) fitted to the end of a length of spring strip 49 and located in the recess 47 such that its largest dimension lies over the outside edge of the frame 41 of the tray. In this position, the card cannot be moved by a sharp corner of the card but the card can be moved by a nicked corner. It is of advantage that the roller is also located such that it extends both below and above the top plane of the support plate so that the card cannot be slid underneath the roller.

The operating means above-mentioned comprises a mechanical linkage between a handle 50 and both the tray 40 and the bars 26. Two plates 51 having end rollers 52 running within the fixed channel member 23 and the movable channel member 12 are rotatable by two links 53 pivotally attached to a disc 50A forming part of the handle 50 to effect vertical movement of the channel member 12 and hence the arms 26 held thereby. The plates 51 are also engageable with the cranked ends 54 of two levers 55 rivetted at their other ends to the frame 41 of the tray 40 and pivoted to the framework of the device at 61. At the pivot points of each lever there is a spring 56 (see FIGURE 1) which biasses the lever into its position shown in FIGURE 14. The effect of these springs is overcome by the plates being held in the position shown in FIGURE 13, which position is retained by a stud 57 engaging with a notch 58 provided in the disc 50A. The stud 57 is rigidly fixed to the end of a rod 59 which passes through a hole in one of the levers 55 and is disengageable from said notch on outward movement of the levers 55 by means of a second stud 60 fixed to the rod 59 and engaging with the outer surface of the lever 55.

In order that such outward movement of the levers 55 may be effected the notch 58, as shown in FIGURE 13, allows slight rotary movement of the disc 50A by the handle 50. This slight movement is sufficient to effect the degree of rotation, about 8°, of the plates 51 necessary to allow the levers to pivot, under the action of the springs 56, from their position shown in FIGURE 13 towards their position shown in FIGURE 14 and to disengage the stud 57 from the notch 58. This action by the levers 55 will thus move the tray from its outermost position towards its innermost position in which the card will lie over the support plate. Further rotation of the plates 51 by rotation of the handle 50 will first complete the said movement of the tray and then lower the channel members 12 and hence the bars 26 thus allowing the card to be sensed by the pins 3. Reverse rotation of the handle 50 will raise the pins and return the tray from its innermost position to its outermost position so re-engaging the stud 57 with the notch 58.

With reference to FIGURE 9, an alternative form of bar 26 is shown in which portions of each bar pass through the pins 3. In such a case the construction of the pins is modified to provide a step 65 the under surface of which is engaged by the bar 26 during their upward movement to raise the pins.

With reference to FIGURE 16, an alternative form of sensing pin 3 is shown, which modified pin is constructed to minimise the gold-plate required therefor. The modified form of pin comprises a lower part 70 and an upper part 71, which parts are provided with contacting webs 72, 73, these webs may, if desired, be secured together. The upper part 71, which is made of gold-plated sheet metal comprises an open-section 74 which tapers at its top end to a part 75, then opens out again to form a second open section 76 and finally two tags 77 which lie close to one another. The lower part 70 is made from non-plated sheet metal and comprises two parallel legs 78 lying close together, which comprise the end of the pin employed to contact the card, and a cranked length of pin 79 which joins the legs 78 to the web 73. The open-section 74 of the upper part 71 houses one of the contacts 32 and the web 73 of the lower part 70 provides a step for engagement by one of the transverse bars 26.

It is to be appreciated that the invention is in no way to be restricted by the details of the example described above. For example each of the contacts 28 has been described as being related to only one pin, but the invention includes devices where the contacts are interlinked with one or more of the other contacts (e.g. in rows transverse to the lengths 17) so that the device may be used as a patchboard.

Also the springs 14 may be omitted and the pins may be lowered by solenoid-operated means. In such a case the bars 26 may also be omitted and the pins may be raised by springs.

Further the bars 26, if provided, may comprise two separate bars passing either side of the pins of each row instead of the single bar above described.

I claim:

1. A sensing device for sensing data holes in a card comprising: a support for the card to be sensed; a plurality of electrically conductive sensing pins arranged in parallel side-by-side relation and guided for movement in the lengthwise direction thereof towards and away from the support; means for moving the pins toward the support to engage a card on the support, to be arrested by the card when no hole is sensed, and to continue their movement through the card when holes are sensed; an electrical contact for each pin on the side of the card remote from the support, said contacts for making electrical connections to the pins only if the movement of the pin is continued through a hole in the card; said pins arranged in a plurality of spaced rows; a movable moulding for each of said rows of pins positioned adjoining the pins and adapted to engage portions of the pins for raising and lowering the pins to sense the holes in the card; two channels which engage the ends of the mouldings for maintaining all the mouldings in a common plane, said channels provided with square teeth for engaging portions of the mouldings to maintain their spaced relation from each other; and means for moving the channels toward and away from the support to effect a card sensing operation.

2. A sensing device as claimed in claim 1 wherein each pin is provided with a projection for engaging said mouldings when the mouldings are moved away from the support.

3. A sensing device as claimed in claim 1 wherein said moulding includes a bar disposed at right angles to the movement of the pins and wherein said bar operates on all the pins in a single row.

4. A sensing device as claimed in claim 1 wherein each of said mouldings includes two bars, each disposed on either side of the sensing pin and each adapted to engage a projection on either side of the pin to move all the pins in a row after a sensing operation.

5. A sensing device as claimed in claim 1 wherein said two channels are operated by a lever system which provides a toggle action to move each moulding away from the support and thereby to lift all the pins from the support.

6. A sensing device as claimed in claim 1 wherein said sensing pins are made of metal strip material and bent on itself to provide two parallel legs which lie close together for part of the length of the pin, thereby providing a folded end for contact with the card; said pins also bent to form a space between the legs for positioning a contact end when the pins do not sense a hole in the card; said pins further bent to form a constriction above said space for making electrical connection with the contact when the pins sense a hole in the card.

7. A sensing device as claimed in claim 1 wherein said sensing pins are gold plated.

8. A sensing device as claimed in claim 1 wherein the sensing pins include a first portion employed to make sensing contact with the card, a second portion including a separated part which surrounds an electrical contact means, and a third portion which is engaged by the electrical contact to complete an external circuit whenever the first portion passes through a hole in the card.

9. A sensing device as claimed in claim 8 wherein the third portion is gold plated.

10. A sensing device as claimed in claim 8 wherein the separated portions of the sensing pins are adapted to make sliding contact with a guide member which includes a plurality of slots cut in a plurality of stationary plates.

11. A sensing device as claimed in claim 8 wherein said second portion of the sensing pins make contact with a conductive plate secured to the stationary means.

12. A sensing device as claimed in claim 8 wherein all of the second portions in each of said rows of pins make contact with a single conductive plate secured to the stationary means.

13. A sensing device as claimed in claim 8 wherein said support is formed with a plurality of holes aligned with the hole positions of the card, said holes for permitting the sensing pins to pass through the support to make a connection with the contact means, and a stop for limiting the travel of the pin.

14. A sensing device as claimed in claim 8 wherein said support is made up of a plurality of non-conductive bars, each bar corresponding in width and position to a row of sensing pins, each of said bars inter-connected at their ends and provided with a plurality of slots which produce holes in the support when the bars are assembled.

15. A sensing device as claimed in claim 8 wherein said third portion of the sensing pins includes a constricted portion which is engaged by the contact on both sides when the pins sense a hole in the card, said constricted portion and said contact making a wiping connection on both sides of the contact to complete an external circuit.

References Cited

UNITED STATES PATENTS

| | | |
|---|---|---|
| 1,984,516 | 12/1934 | Brougham. |
| 3,034,711 | 5/1962 | Cohen. |
| 3,139,519 | 6/1964 | Reinschmidt. |
| 3,352,981 | 11/1967 | Ekers. |
| 3,017,082 | 1/1962 | Riddiford et al. |

MAYNARD R. WILBUR, *Primary Examiner.*

THOMAS J. SLOYAN, *Assistant Examiner.*

U.S. Cl. X.R.

200—46